United States Patent
Lee et al.

(10) Patent No.: US 7,974,456 B2
(45) Date of Patent: Jul. 5, 2011

(54) SPATIAL-TEMPORAL REGULATION METHOD FOR ROBUST MODEL ESTIMATION

(75) Inventors: Shih-Jong J. Lee, Bellevue, WA (US); Seho Oh, Bellevue, WA (US); Hansang Cho, Bellevue, WA (US)

(73) Assignee: DRVision Technologies LLC, Bellevue, WA (US)

( * ) Notice: Subject to any disclaimer, the term of this patent is extended or adjusted under 35 U.S.C. 154(b) by 1070 days.

(21) Appl. No.: 11/516,351

(22) Filed: Sep. 5, 2006

(65) Prior Publication Data

US 2008/0056589 A1    Mar. 6, 2008

(51) Int. Cl.
*G06K 9/00* (2006.01)
(52) U.S. Cl. ........................................ 382/133
(58) Field of Classification Search ........... 382/128–134
See application file for complete search history.

(56) References Cited

U.S. PATENT DOCUMENTS

| | | | | |
|---|---|---|---|---|
| 5,828,793 | A * | 10/1998 | Mann | 382/284 |
| 5,989,835 | A | 11/1999 | Dunlay et al. | |
| 6,480,876 | B2 * | 11/2002 | Rehg et al. | 718/100 |
| 6,631,212 | B1 * | 10/2003 | Luo et al. | 382/228 |
| 6,771,736 | B2 * | 8/2004 | Sabol et al. | 378/98.12 |
| 6,859,550 | B2 * | 2/2005 | Oh et al. | 382/155 |
| 7,190,809 | B2 * | 3/2007 | Gutta et al. | 382/103 |
| 2003/0036853 | A1 | 2/2003 | Sammak et al. | |
| 2003/0036855 | A1* | 2/2003 | Harris et al. | 702/19 |
| 2004/0101912 | A1 | 5/2004 | Rubin et al. | |
| 2005/0232474 | A1* | 10/2005 | Wei et al. | 382/128 |
| 2006/0039593 | A1* | 2/2006 | Sammak et al. | 382/133 |
| 2006/0072817 | A1* | 4/2006 | Lee et al. | 382/173 |
| 2008/0292194 | A1* | 11/2008 | Schmidt et al. | 382/217 |

OTHER PUBLICATIONS

Brown, L.M. (Dec. 2001) "3D head tracking using motion adaptive texture-mapping." Proc. 2001 IEEE CS Conf. on Computer Vision and Pattern Recognition, vol. 1 pp. 998-1003.*
Wang et al. (May 2000) "A confidence measure based moving object extraction system built for compressed domain." Proc. 2000 IEEE Intl Symp. on Circuits and Systems, vol. 5 pp. 21-24.*
Paterson et al. (Sep. 2003) "3D head tracking using non-linear optimization." British Machine Vision Conf.*
Coleman et al. (Sep. 1980) "A system of subroutines for iteratively reweighted least squares computations." ACM Trans. on Mathematical Software, vol. 6 No. 3, pp. 327-336.*
Tosteson et al. (Dec. 1999) "Confidence maps and confidence intervals for near infrared images in breast cancer." IEEE Trans. on Medical Imaging, vol. 18 No. 12, pp. 1188-1193.*
Elwenspoek M "The ideal law of mass action and first-order phase transition", J. Phys. A: Math. Gen. 16 No. 12 (Aug. 21, 1983) L435-L437.

* cited by examiner

*Primary Examiner* — Bhavesh Mehta
*Assistant Examiner* — Barry Drennan

(57) ABSTRACT

A computerized spatial-temporal regulation method for accurate spatial-temporal model estimation receives a spatial temporal sequence containing object confidence mask. A spatial-temporal weight regulation is performed to generate weight sequence output. A weighted model estimation is performed using the spatial temporal sequence and the weight sequence to generate at least one model parameter output. An iterative weight update is performed to generate weight sequence output. A weighted model estimation is performed to generate estimation result output. A stopping criteria is checked and the next iteration iterative weight update and weighted model estimation is performed until the stopping criteria is met. A model estimation is performed to generate model parameter output. An outlier data identification is performed to generate outlier data output. A spatial-temporal data integrity check is performed and the outlier data is disqualified.

10 Claims, 7 Drawing Sheets

SPATIAL-TEMPORAL REGULATION METHOD FOR ROBUST MODEL ESTIMATION

TECHNICAL FIELD

This invention relates to the enhancement of model estimation and data integrity assurance in spatial temporal image sequence.

BACKGROUND OF THE INVENTION

A new generation of microscope and fluorescent probe technologies has enabled highly sensitive quantitative characterization of subcellular objects, such as discrete proteins, organelles, receptors, vesicles, axon terminals and dendritic spines, in live cell digital microscopy based functional assays. The multi-dimensional images in these assays contain huge information content; hundreds or thousands of subcellular objects, or puncta, per image frame and hundreds or thousands of frames per image. The manual recognition of objects in these images is too time consuming. The introduction of automated recognition methods can improve the analysis speed and statistical power of the assay in an unbiased fashion. However, when approaching the sensitivity limit, the fluorescently labeled puncta often exhibit weak signal that is unstable due to noise and variations. This can confound traditional methods of image recognition, and imposes a critical limitation on the achievable resolution, sensitivity and characterization accuracy of the assay. New technologies are needed to enable the robust and accurate analysis of puncta related phenotypes in microscopy images; these technologies enable analytic tools that can reliably screen for puncta related phenotypes at high rates in both basic research (e.g. phenotyping) and applied research (e.g. drug discovery).

Innovative informatics approaches that enable and improve live cell, time-lapse studies of subcellular components will be a fundamental technology underlying critical, next generation assays of cellular function. Subcellular assays give scientists greater resolution as they attempt to dissect cell function, because they yield more direct measurements of the subcellular components underlying the cell functions. For example, measuring the release of a single synaptic vesicle, rather than the neurotransmitter release of the entire cell, or measuring the receptors in a single dendritic spine, rather than those of the whole cell.

The outcome of a quantitative time-lapse assay is an estimate of the parameters of the underlying model such as the "the law of mass action" (Elwenspoek M, "The ideal law of mass action and first-order phase transition", J. Phys. A: Math. Gen. 16 No 12 (21 Aug. 1983) L435-L437). This is accomplished by fitting measured data to the model. The fitting process makes an assumption of the scatter of the measured data and performs maximum likelihood estimation or other estimation methods.

Conventional methods of model fitting are sensitive to noise or distortion in the measured data. Current High Content Screening tools: Cellomics ArrayScan' assay analysis. (Dunlay et al. 1999. System for cell-based screening. U.S. Pat. No. 5,989,835.), Cellomics KineticScan product, (Sammak, Paul et al. 2003. Automated assay approach for identification of individual cells during kinetic assays. US patent application 20030036853.), GE's In Cell Analyzer high content screening product (Harris, Timothy D. et al. 2003. Method and apparatus for screening chemical compounds. US Patent Application no. 2003/0036855.) and spot analysis in receptor internalization assays (Rubin, Richard et al. 2004. System for cell-based screening. US patent application 20040101912.); lack robust, integrated model fitting capability and only offer assay statistics such peak intensity, time to peak intensity, average intensity (over the time course), number of oscillations etc.

OBJECTS AND ADVANTAGES

The spatial-temporal regulation method of this invention seeks to address the model estimation method and model integrity. It consists of robust model fitting, data integrity assurance, and systematic deviation identification. The key innovation is the direct use of the outcome to enhance the results. Unexpected types of objects may exist in an assay. A semi-automatic discovery tool can be developed to facilitate the human review of the data for the discovery of new classes of unexpected yet systematic behavior of experimental subjects.

The objectives of the spatial-temporal regulation method of this invention are:
(1) use known model constraint to enhance the estimation;
(2) use initial outcome to condition data for estimation refinement and lowering the effect of outliers;
(3) incorporate the spatial-temporal information for deviation checking;
(4) allow the data correction directed by the expected outcome;
(5) identify the data with real deviation for discovery of new classes of behavior.

SUMMARY OF THE INVENTION

A computerized spatial-temporal regulation method for accurate spatial-temporal model estimation receives a spatial temporal sequence containing object confidence mask. A spatial-temporal weight regulation is performed to generate weight sequence output. A weighted model estimation is performed using the spatial temporal sequence and the weight sequence to generate at least one model parameter output. An iterative weight update is performed to generate weight sequence output. A weighted model estimation is performed to generate estimation result output. A stopping criteria is checked and the next iteration iterative weight update and weighted model estimation is performed until the stopping criteria is met. A model estimation is performed to generate model parameter output. An outlier data identification is performed to generate outlier data output. A spatial-temporal data integrity check is performed and the outlier data is disqualified.

BRIEF DESCRIPTION OF THE DRAWINGS

The preferred embodiment and other aspects of the invention will become apparent from the following detailed description of the invention when read in conjunction with the accompanying drawings, which are provided for the purpose of describing embodiments of the invention and not for limiting same, in which.

DETAILED DESCRIPTION OF THE INVENTION

I. Basic Spatial-Temporal Model Estimation

Figure 1:
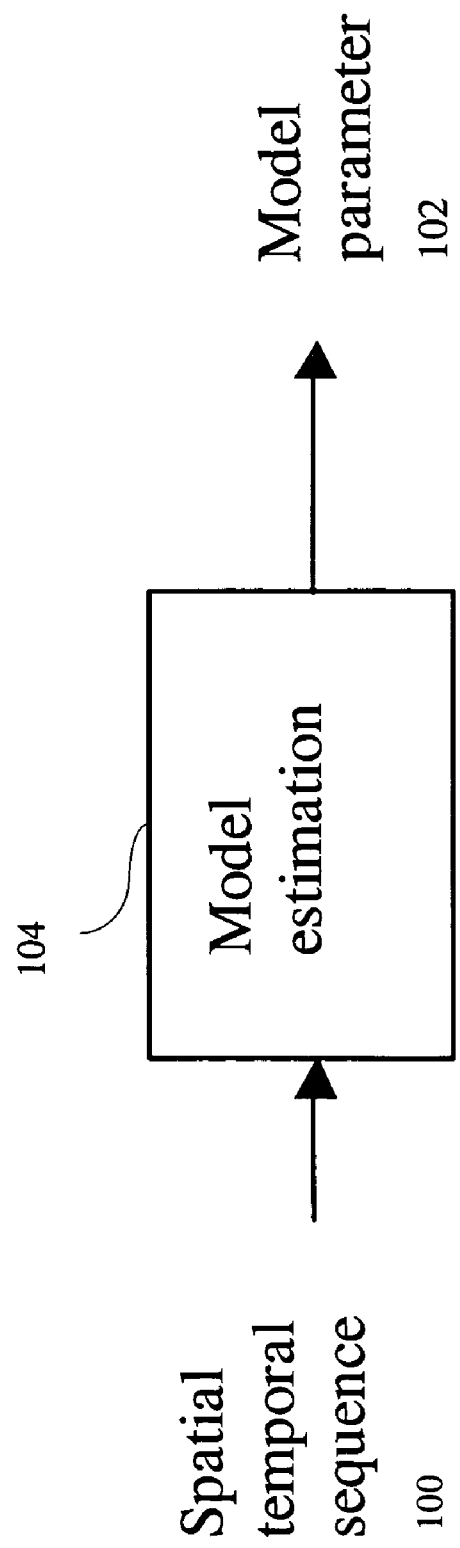
FIG. 1 shows the processing flow for the basic spatial-temporal model estimation method.

The basic spatial-temporal model estimation processing flow is shown in FIG. 1. As shown in the figure, a spatial temporal sequence 100 is subjected to a computerized model estimation stage 104 to estimate at least one model parameter 102. In one preferred embodiment of the invention, the model estimation is performed using a nonlinear regression method.

II. Spatial-Temporal Regulation for Model Estimation

The Spatial-temporal Model estimation could be improved when using different confidence weights for different time points. In a subcellular assay, it is known that the pixel intensities do not fluctuate rapidly. If the intensity value of the pixel at a time point is significantly different from the pixel intensities of the previous and the next time points, the pixel may be given low confidence for model estimation. Spatial-Temporal Regulation (STR) makes use of the distribution within each object of the adjacent frame temporal intensity difference, $\Delta F_t(x,y)$, to identify those low-confident pixels. The unreliable pixels are discounted from feature measurements by assigning very low weights, $w_t$, for that time frame.

Figure 2:
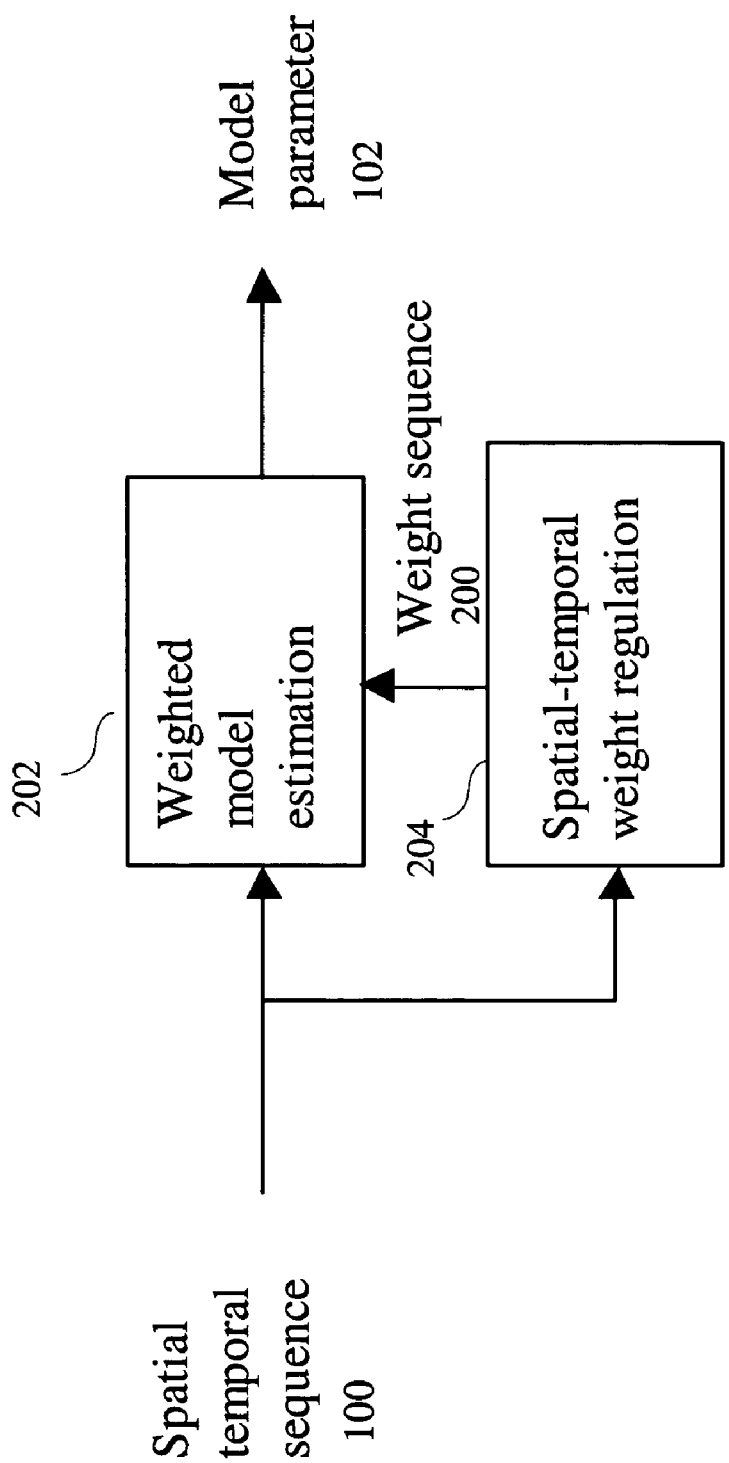
FIG. 2 shows the processing flow for the spatial-temporal regulation method.

The processing flow for the spatial-temporal regulation method is shown in FIG. 2. As shown in FIG. 2, a spatial temporal sequence 100 containing a plurality of image frames enclosing at least one object in each frame is inputted. The object is represented by its confidence mask. The confidence mask represents an object by its associated pixels and the confidence values of the pixels. This is different from the binary mask representation that represents an object only by its associated pixels having "ON" or "OFF" states. The confidence mask can be time dependent. That is, the mask and values are different at different time points (frames), we call the time dependent confidence mask as confidence mask sequence.

The spatial temporal sequence input is processed by a computerized spatial-temporal weight regulation step 204 to generate weight sequence 200 for weighted model estimation 202. The weighted model estimation 202 outputs at least one model parameter 102.

Spatial-Temporal Weight Regulation

In one embodiment of the invention, the spatial-temporal weight regulation method determines weight sequence using spatial-temporal confidence based regulation. The spatial-temporal confidence based regulation method generates a spatial-temporal confidence sequence $C_t(x, y)$ integrating the object confidence mask $S_t(x, y)$ and temporal confidence sequence $T_t(x, y)$.

In one embodiment of the invention wherein the image pixel is 8 bit deep and the temporal confidence sequence, $T_t(x,y)$, is calculated by $$T_t(x,y) = 255 - (255 \times \Delta F_t(x,y))$$

where the variation of the adjacent frame temporal intensity, $\Delta F_t(x,y)$, is defined by $$\Delta F_t(x, y) = \frac{\sum_{i=-2}^{1} \frac{|I_{t+i}(x, y) - I_{t+i+1}(x, y)|}{I_{t,avg}(x, y)}}{4}$$

$$I_{t,avg}(x, y) = \frac{I_{t-1}(x, y) + I_t(x, y) + I_{t+1}(x, y)}{3}$$

Since the temporal confidence, $T_t(x,y)$, has to be greater than 0, we set $T_t(x,y) = \max(0, T_t(x,y))$. For the second frame and the second to last frame, only two intensity variations are involved to get temporal confidence $T_t(x,y)$. Those ordinary skill in the art should recognize that other methods of temporal confidence sequence generation could be applied within the scope of this invention.

In one embodiment of the invention, the integration can be done by multiplication assuming the confidence are independently derived:

$$C_t(x,y) = S_t(x,y) \times T_t(x,y)$$

Other integration method such as linear combination, division (normalization) can also be used for integration.

The confidence sequence is used to create the weight sequence. In one embodiment of the invention, the weight sequence, $w_t$, is derived by accumulating the confidence values for the object as follows:

$$w_t = \frac{\sum_{(x,y \in O)} C_t(x, y)}{\sum_{(x,y \in O)} C_{max}(x, y)}$$

where $C_{max}(x, y)$: the maximum value of $C_t$.

In this embodiment, $w_t$ is the summation of the confidence for all pixels of the object. The summation is normalized by dividing it by the summation of the maximum spatial-temporal confidence value in the object.

Weighted Model Estimation

In one embodiment of the invention, the modified nonlinear regression method is used for model parameter estimation. The modification allows weighted fitting. This method is general purpose and is applicable to other model estimation not just for the destaining model.

In the destaining model example, to find the optimized $I(t_i) = Ae^{\alpha t_i} + B$, which fits the input signal $y_i$ with the weight $w_i$, the cost function c is defined as $$c = \frac{1}{N} \sum_i w_i [Ae^{-\alpha t_i} + B - y_i]^2, \text{ where } N = \sum_i w_i$$

To minimize this cost function, the derivatives to the three parameters are set to zero. That is, $$\frac{\partial c}{\partial A} = 0, \frac{\partial c}{\partial B} = 0, \frac{\partial c}{\partial \alpha} = 0$$

The solution are done in three steps:

(1) To solve $$\frac{\partial c}{\partial \alpha} = 0,$$

the α derivative of the cost function c is calculated as follows:

$$\frac{\partial c}{\partial \alpha} = \frac{2}{N}\sum_i t_i e^{-\alpha t_i}[Aw_i e^{-\alpha t_i} + Bw_i - y_i w_i] = 0$$

By arranging the formula, we can define a function $f(\alpha)$ $$f(\alpha) = A<te^{-2\alpha t}>_w + B<te^{-\alpha t}>_w - <yte^{-\alpha t}>_w$$

α is determined by solving $f(\alpha)=0$. This is performed by a nonlinear regression procedure.

(2) With given α, we can find B by solving $$\frac{\partial c}{\partial B} = 0$$

$$c = \frac{1}{T}\sum_i w_i[Ae^{-\alpha t_i} + B - y_i]^2$$

$$\frac{\partial c}{\partial B} = \frac{2}{T}\sum_i [Aw_i e^{-\alpha t_i} + Bw_i - y_i w_i]$$

$$= 0$$
$$= A\langle e^{-\alpha t}\rangle_w + B + \langle y\rangle_w$$
$$= 0$$

$$\therefore B = \langle y\rangle_w - A\langle e^{-\alpha t}\rangle_w$$

(3) With given $B = <y>_w - A<e^{-\alpha t}>_w$, we can find A by solving $$\frac{\partial c}{\partial A} = 0$$

$$c = \frac{1}{N}\sum_i [A(e^{-\alpha t_i} - \langle e^{-\alpha t}\rangle_w) - (y_i - \langle y\rangle_w)]^2$$

$$\frac{\partial c}{\partial A} = \frac{1}{N}\sum_i (e^{-\alpha t_i} - \langle e^{-\alpha t}\rangle_w)[A(e^{-\alpha t_i} - \langle e^{-\alpha t}\rangle_w) - (y_i - \langle y\rangle_w)] = 0$$

$$A\langle (e^{-\alpha t_i} - \langle e^{-\alpha t}\rangle_w)^2\rangle_w - \langle (e^{-\alpha t_i} - \langle e^{-\alpha t}\rangle_w)(y_i - \langle y\rangle_w)\rangle_w = 0$$

$$\therefore A = \frac{\langle e^{-\alpha t}y\rangle_w - \langle e^{-\alpha t}\rangle_w\langle y\rangle_w}{\langle e^{-2\alpha t}\rangle_w - \langle e^{-\alpha t}\rangle_w^2}$$

Figure 3A:
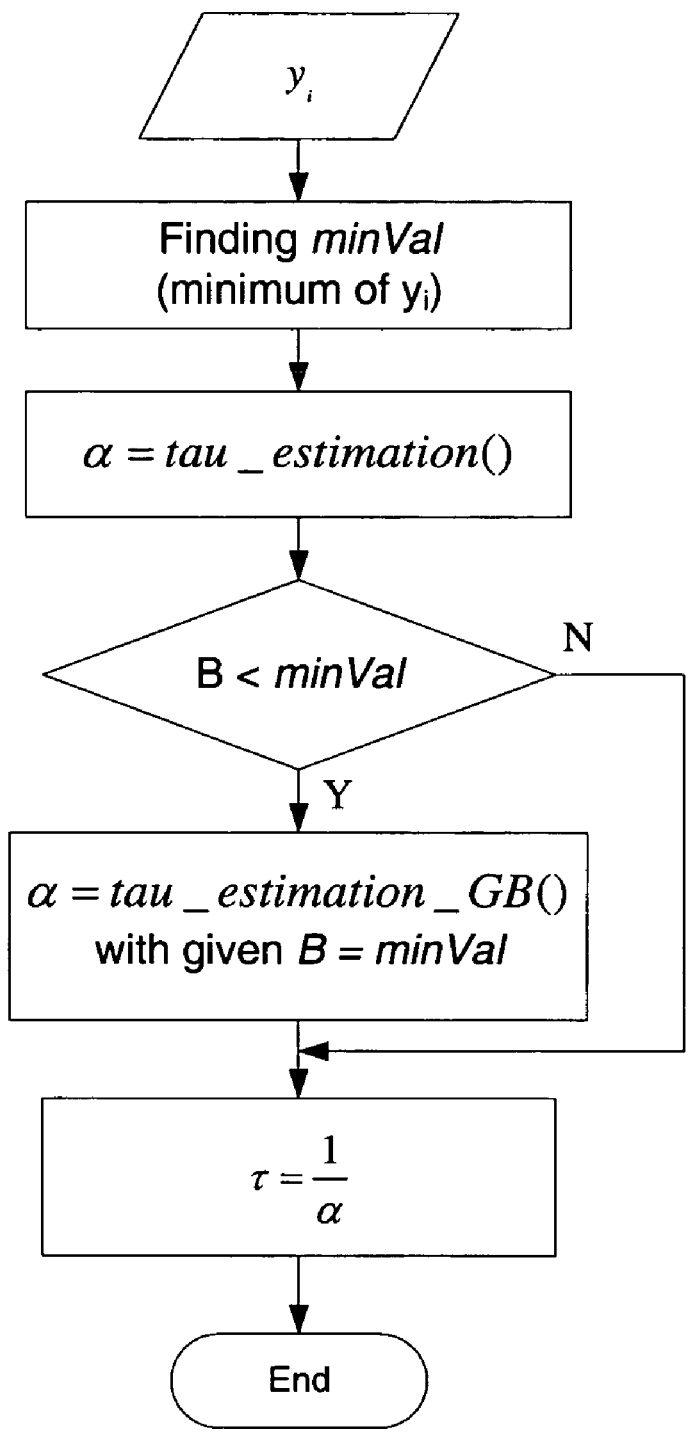
FIG. 3A shows the processing flow chart for finding the optimal a value.
Figure 3B:
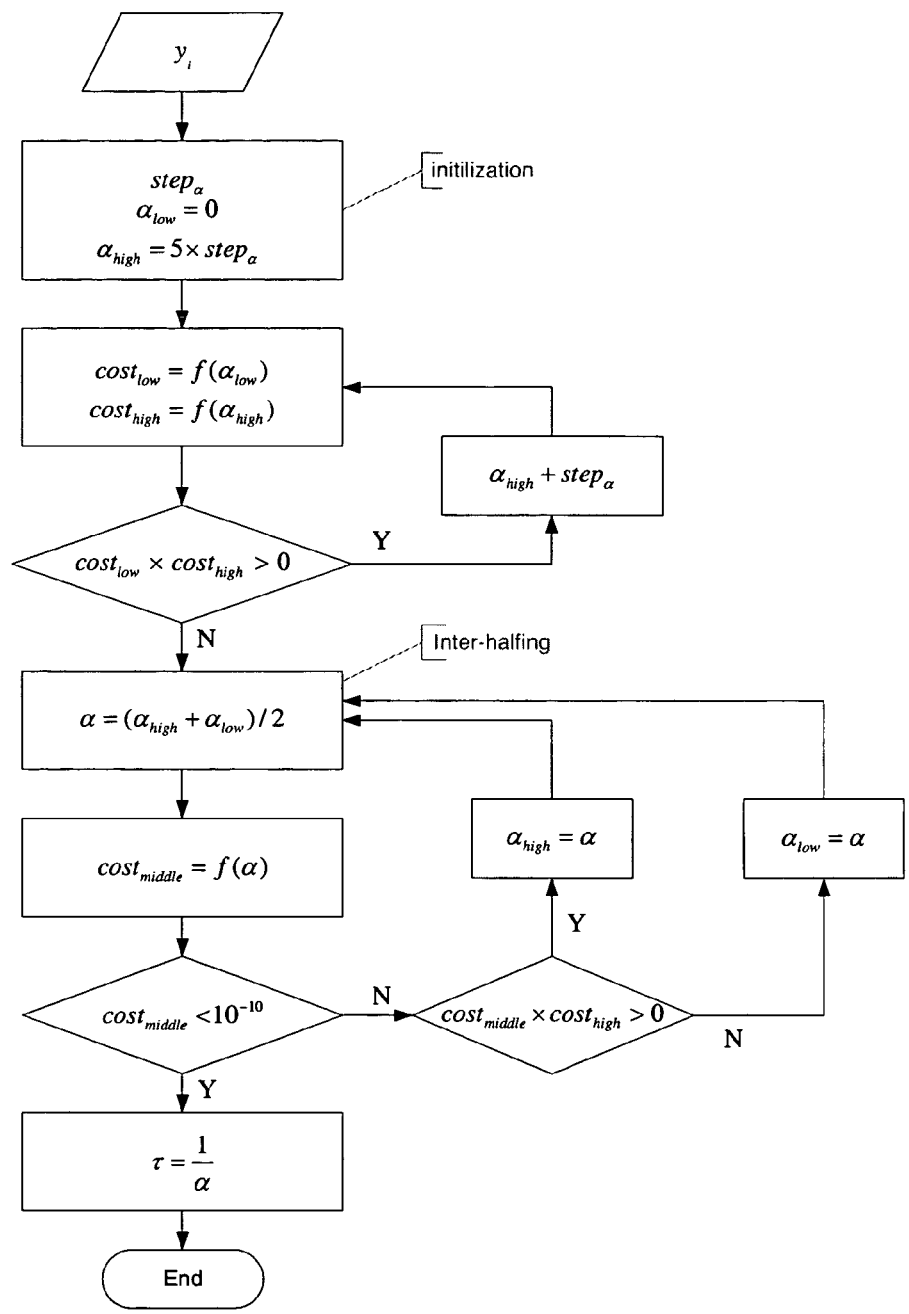
FIG. 3B shows the processing flow chart for the tau_estimation( ) function.

The flow chart for finding the optimal α is shown in FIG. 3A and the processing flow chart for the tau_estimation( ) function is shown in FIG. 3B. As shown in the Figures, an initial low and high α values containing $f(\alpha)=0$ within its range are defined. One of the low or high values is reduced to its half distance value in the next iteration. This allows quick convergence to find the a value that is close to $f(\alpha)=0$.

III. Iterative Improvement Method for Model Estimation

Figure 4:
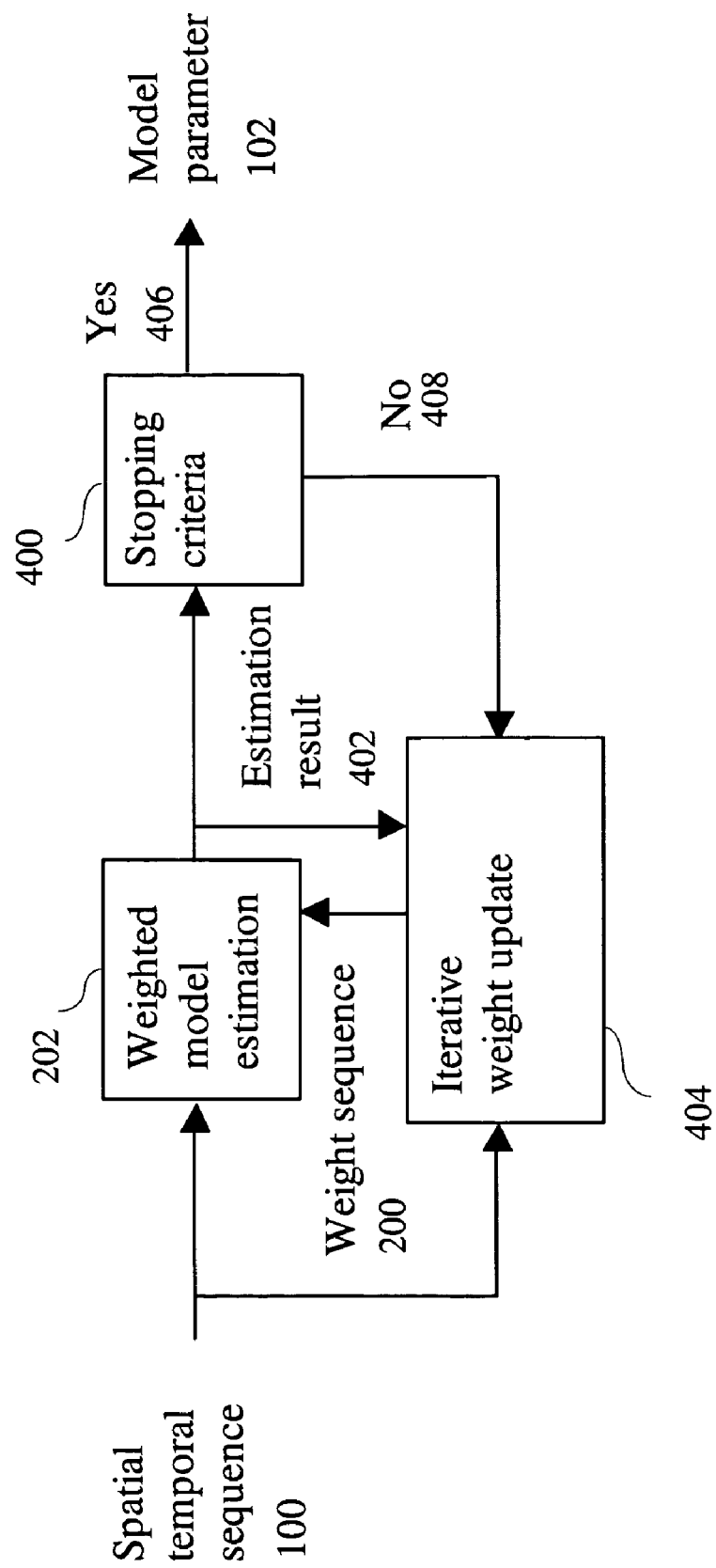
FIG. 4 shows the processing flow for the iterative improvement method for model estimation.

The model estimation is improved with appropriate temporal confidence values based on their reliabilities. The confidence values are determined iteratively from the previous iteration fitting result. The processing flow for the iterative improvement method for model estimation is shown in FIG. 4. As shown in FIG. 4, the spatial temporal sequence input 100 is processed by a weighted model estimation step 202. The weighted model estimation 202 outputs estimation result 402 using the spatial temporal sequence 100 and the weight sequence 200. The weight sequence 200 is generated and updated iteratively from the estimation result 402 by an iterative weight update step 404. The weight sequence 200 generated from the current iteration is applied to the next iteration weighted model estimation 202. The iterative process continues until a stopping criteria 400 is met. In one embodiment of the invention, the stopping criteria includes the maximum number of iterations. In another embodiment of the invention, the stopping criteria checks the difference of the weight sequence between consecutive iterations and stops when the difference is small. In yet another embodiment of the invention, the stopping criteria checks the difference of the estimation result between consecutive iterations and stops when the difference is small. When the stopping criteria is met ("Yes" 406), the estimation result 402 at the current iteration becomes the model parameter 102 result of the process. Otherwise ("No 408), the iteration continues.

The τ fitting result at one iteration including the input data and the estimated result. The iterative weight update method updated the weights for the data points wherein the data with large errors are given smaller weights. The updated weights will be used for the model estimation in the next iteration.

In one embodiment of the invention, the steps for the iterative improvement method for model estimation are listed as follows:

Unweighted fitting is performed at the first iteration.

After each fitting iteration, errors between input signal (spatial temporal sequence) and expected signal (sequence) based on the current τ estimation result are used to derive confidence weight sequence for the next iteration.

The algorithm for iterative method is described as

---

τ_curve$_{t,fitting}$ = curvefitting($I_t(x, y)$)
for (iteration = 2; iteration<=n; iteration++)
{

$$w_t \exp\left\{\frac{-c \cdot \varepsilon_t^2}{(\max_{err_t} - \min_{err_t})}\right\}, \text{ c is a const.}$$

Where $$\varepsilon_t = \left|\frac{\sum_{(x,y\in 0)} I_t(x, y)}{N} - \tau\_curve_{t,fitting}\right|$$

}
τ_curve$_{t,fitting}$ = weighted_curvefitting($I_t(x, y)$, $w_t$)

---

To assign appropriated weight values to each time point, we used exponential function so that it can discriminate higher confidence from lower one effectively. If the error, which is derived from the difference between the actual intensity and the estimated intensity by τ estimation, is smaller, much lower weight value is mapped by the exponential function than the linear function.

IV. Iterative Spatial-Temporal Regulation for Model Estimation

Figure 5:
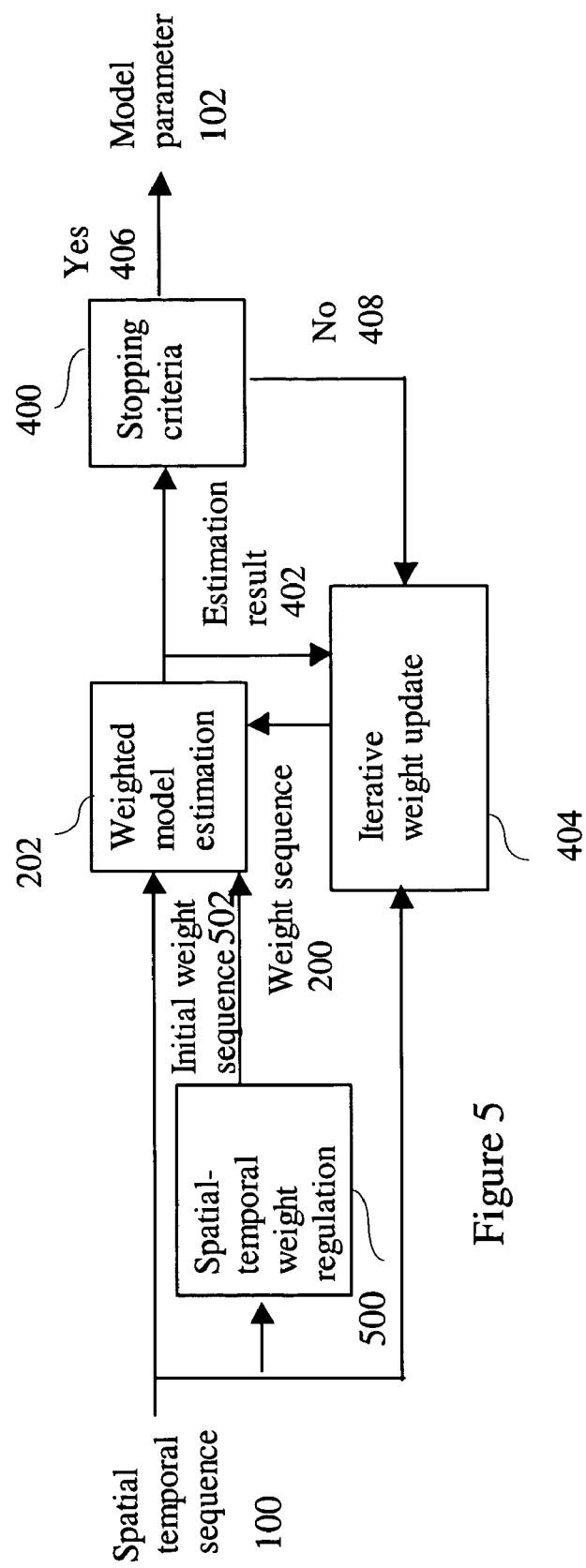
FIG. 5 shows the processing flow for the iterative spatial-temporal regulation for model estimation.

The spatial-temporal regulation method and the iterative improvement method can be combined for improved model estimation as shown in FIG. 5. As shown in FIG. 5, the spatial-temporal weight regulation 500 is applied to generate initial weight sequence 502 for the initial estimation and the iterative weight update 404 is then applied to generate updated weight sequence 200 to improve the initial model estimation through weighted model estimation 202. The weight sequence 202 generated from the current iteration is applied to the next iteration weighted model estimation 202. The iteration continues until a stopping criteria 400 is met. When the stopping criteria is met ("Yes" 406), the estimation result 402 at the current iteration becomes the model parameter 102 result of the process. Otherwise ("No 408), the iteration continues.

V. Data Integrity Assurance

The iterative improvement method has ability to identify and reduce the temporal image frame with large errors by adjusting their weight values. This is a passive approach. It changes the way the data is used but it does not change the data even if they are in error.

The data assurance method of this invention is an active approach. In this approach, if a point with large error is detected and the error is determined as an outlier, the data is disqualified for model estimation. Alternatively, the error of the data is corrected and the corrected data is used for updated model estimation. One large source of measurement error is caused by the spatial positional shift of the object between time frames. This could be due to the movement of the objects and/or the camera and/or the positioning system. Therefore, the data integrity assurance method searches the misplaced objects in the neighborhood and restores them for model estimation update.

Figure 6:
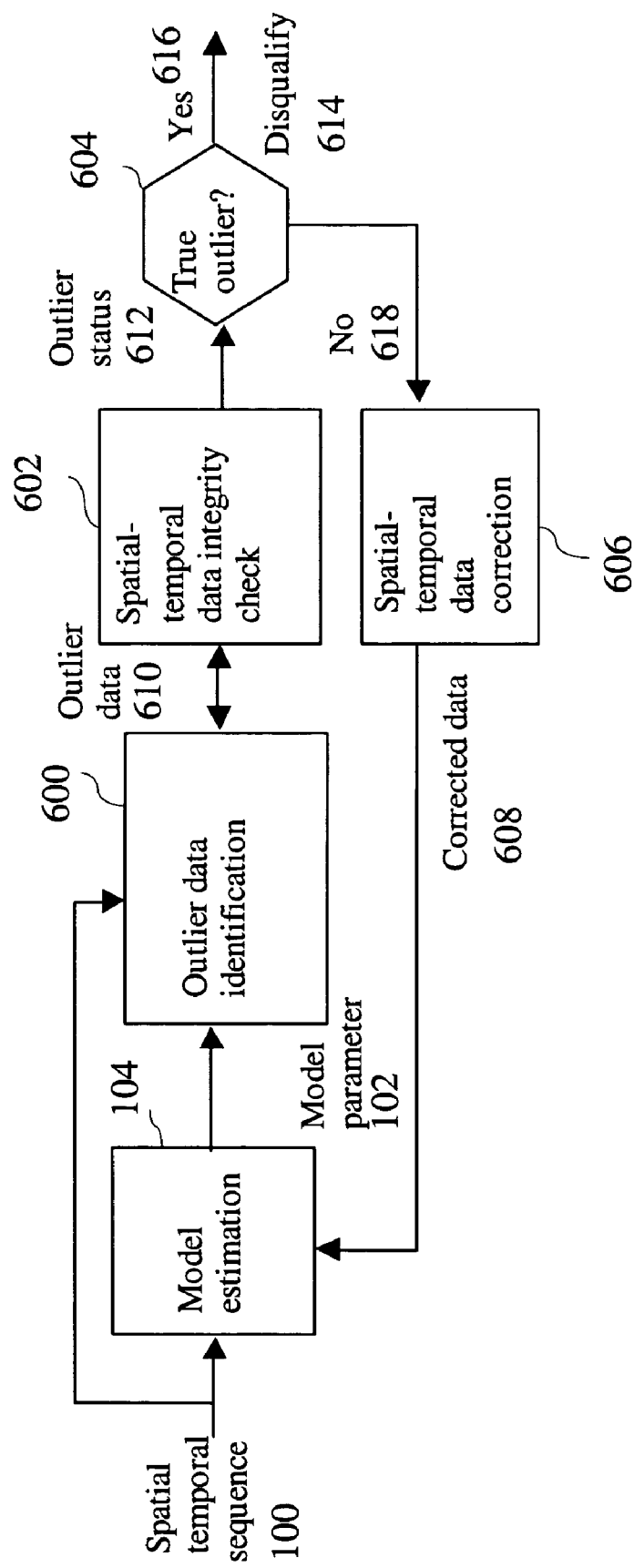
FIG. 6 shows the processing flow for the data integrity assurance method.

The processing flow for the data integrity assurance is shown in FIG. 6. The spatial temporal sequence 100 is used for model estimation 104 and the model estimation result, model parameter 102, is used to identify outlier data 610 by an outlier data identification step 600. The outlier data 610 is subjected to the spatial-temporal data integrity check 602. The outlier status 612 result determines whether the data is a true outlier 604 or it is the result of a measurement error. If it is determined as a legitimate outlier ("Yes" 616), the data is disqualified 614 for model fitting. Otherwise ("No" 618), the measurement error of the data is corrected by a spatial-temporal data collection step 606 and the corrected data 608 is used for updated model estimation 104. Note that the model estimation could also use the spatial-temporal regulation or iterative improvement methods to enhance the results.

Outlier Data Identification

The outlier data identification step identifies the temporal image frames with large error. The error between the estimation result derived from the estimated model parameter and the real value from the spatial temporal sequence is calculated. If the error is larger than a threshold, the error is considered as an outlier, and the data point is subjected to the spatial-temporal data integrity check.

Spatial-Temporal Data Integrity Check

One large source of measurement error is caused by the spatial position shifting of the object between different time-lapse frames. This could be due to the movement of the objects and/or the camera and/or the positioning system. Therefore, in one embodiment of the invention, the spatial-temporal data integrity check first identifies the image frame that introduces the large error. It then checks the temporal variation values of the object around the frame. If the temporal variation values are significantly greater than the average value of the object, the data is potentially not a true outlier. In this case, we can shift and re-measure the object feature for multiple shift positions around this temporal frame. The new feature values after the position shifts are used to further determine the outlier data status.

If at least one of the new values makes the data become a non-outlier, the data is considered not a true outlier and the best (closest to the model) new (shifted) value replaces the old one for model estimation. This is performed by the spatial-temporal data correction step. If all new values are also outliers, the data is considered a true outlier and it is disqualified from the model fitting.

VI. Model Adequacy Regulation

This invention allows a model adequacy regulation step to identify multiple populations when data points that appear to be outliers are in fact members of distinctive populations. When there are many true outliers detected by the iterative method, the model adequacy regulation process performs a new model fitting for the true outliers. If a significant number of previous outliers can be fitted into a new model, the new model is considered a different population.

Our iterative model estimation method performs the model fitting to the dominant model parameter, and leaves the data points with non-dominant model parameter as outliers. By repetition, the result of the model estimation comes closer to the dominant model parameter. Since the initial model parameter estimation is based on the combination of multiple model parameter population it is difficult to detect a new model in the first estimation. However, the iterative method drives estimated model parameter closer to the dominant model parameter value out of the multiple populations after repetition.

The invention has been described herein in considerable detail in order to comply with the Patent Statutes and to provide those skilled in the art with the information needed to apply the novel principles and to construct and use such specialized components as are required. However, it is to be understood that the inventions can be carried out by specifically different equipment and devices, and that various modifications, both as to the equipment details and operating procedures, can be accomplished without departing from the scope of the invention itself.

What is claimed is:

1. A computerized spatial-temporal regulation method for more accurate spatial-temporal model estimation in quantitative microscopy data analysis for detecting puncta related phenotypes comprising the steps of:
   a) Inputting a spatial temporal sequence containing an object confidence mask from microscopy time-lapse studies of subcellular components;
   b) Using the spatial temporal sequence to generate a temporal confidence sequence from variation of adjacent frame temporal intensity and integrating with the object confidence mask to obtain a weight sequence output;
   c) Performing weighted fitting using the spatial temporal sequence and the weight sequence to obtain at least one model parameter output.

2. The spatial-temporal regulation method of claim 1 wherein the temporal confidence sequence $T_i(x,y)$ is generated for image pixel of 8 bit deep is defined by $$T_i(x,y)=255-(255\times \Delta F_i(x,y))$$

where $\Delta F_i(x,y)$ is variation of adjacent frame temporal intensity.

3. The spatial-temporal regulation method of claim 1 wherein the weighted model estimation uses a modified non-linear regression method.

4. The spatial-temporal regulation method of claim 1 wherein the at least one model parameter is a destaining constant $\tau$ wherein $\tau$ is $1/\alpha$ of destaining model $I(t_i)=Ae^{\alpha t_i}+B$.

5. A computerized iterative improvement method for more accurate spatial-temporal model estimation in quantitative microscopy data analysis for detecting puncta related phenotypes comprising the steps of:
   a) Inputting a spatial temporal sequence containing an object confidence mask and an initial weight sequence from microscopy time-lapse studies of subcellular components;
   b) Performing an iterative weight update to generate a weight sequence output;
   c) Performing a weighted fitting using the spatial temporal sequence and the weight sequence to obtain an estimation result output;

Performing a stopping criteria check and continuing the next iteration of iterative weight update and weighted model estimation until the stopping criteria is met;

Outputting the estimation result as the model parameter output when the stopping criteria is met.

6. The iterative improvement method of claim 5 wherein the iterative weight update method uses an exponential function to discriminate higher confidence from lower one.

7. The iterative improvement method of claim 5 wherein the iterative weight update method uses errors between the input spatial temporal sequence and expected sequence based on the estimation result to generate weight sequence.

8. The iterative improvement method of claim 5 uses the spatial temporal sequence to generate a temporal confidence sequence from variation of adjacent frame temporal intensity and integrating with the object confidence mask to obtain a weight sequence output.

9. The iterative improvement method of claim 8 wherein the temporal confidence sequence $T_i(x,y)$ is generated for image pixel of 8 bit deep is defined by $$T_i(x,y)=255-(255\times \Delta F_i(x,y))$$

where $\Delta F_i(x,y)$ is variation of adjacent frame temporal intensity.

10. The iterative improvement method of claim 5 wherein the model parameter is a destaining constant $\tau$ wherein $\tau$ is $1/\alpha$ of destaining model $I(t_i)=Ae^{-\alpha t_i}+B$.

* * * * *